Nov. 1, 1927.
A. A. BRUDER
1,647,392
FURNACE
Filed July 31, 1925
5 Sheets-Sheet 5
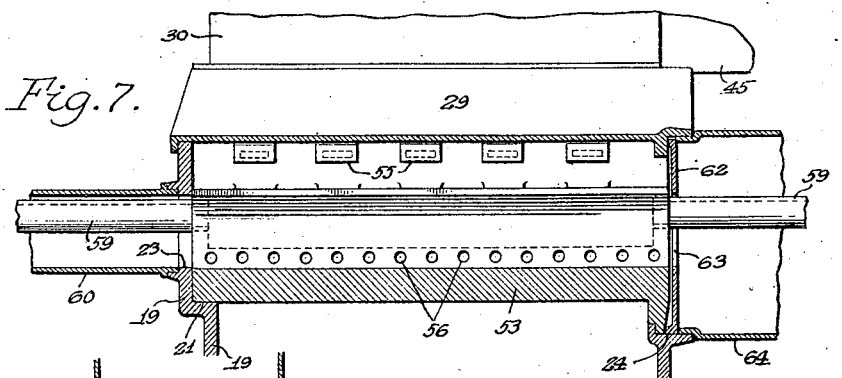
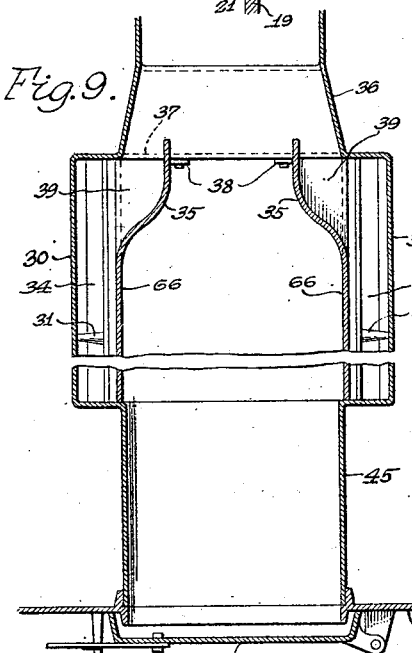
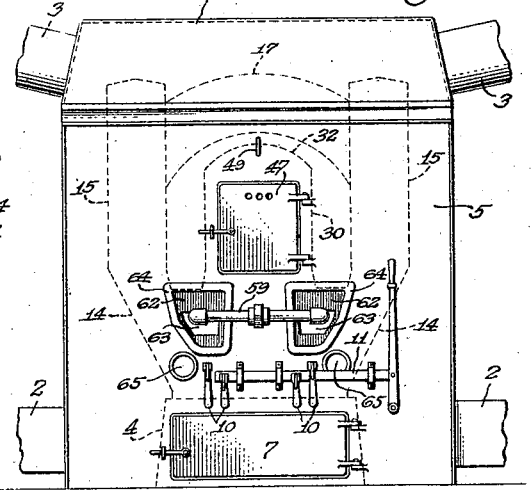
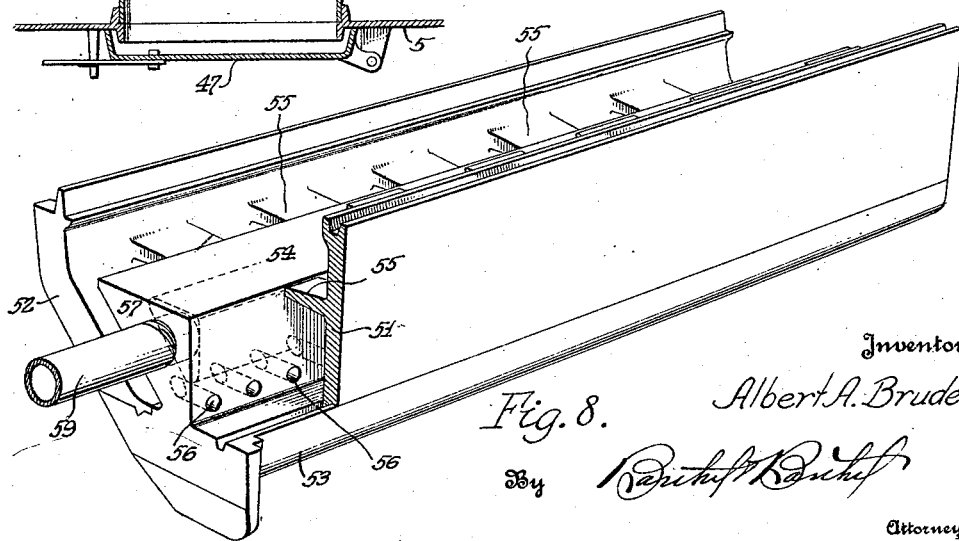
Inventor
Albert A. Bruder,
By
Attorneys Patented Nov. 1, 1927.

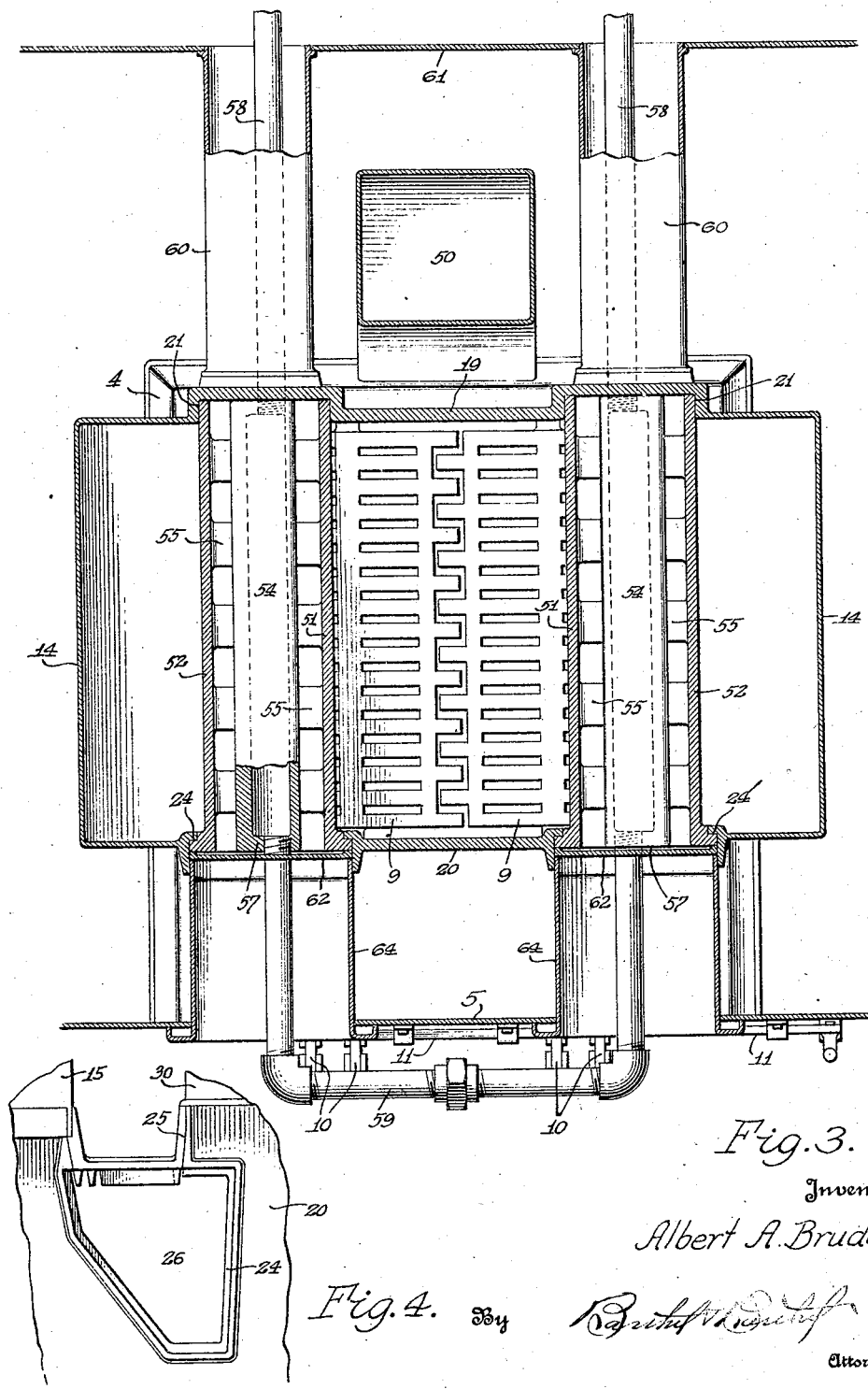

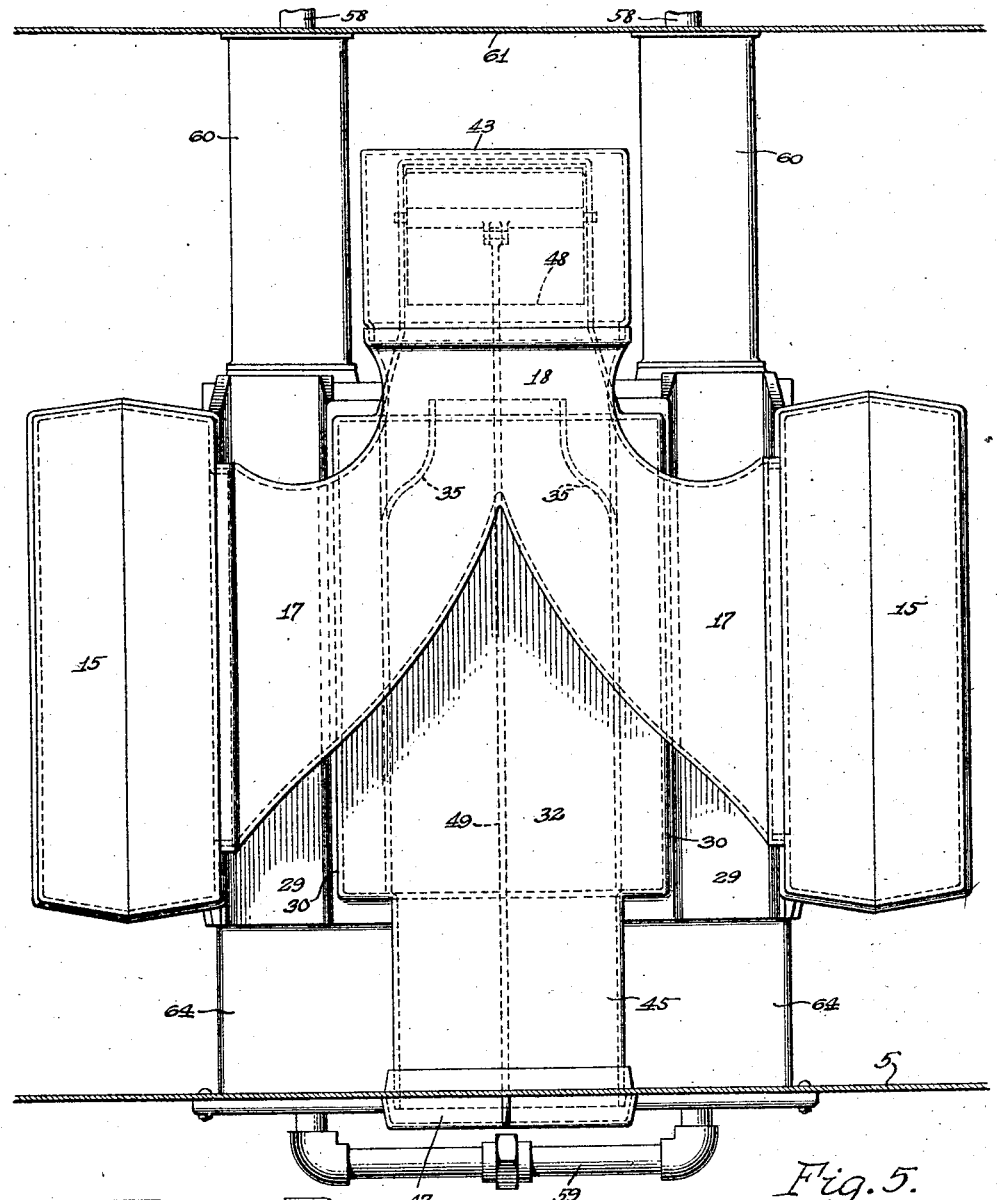
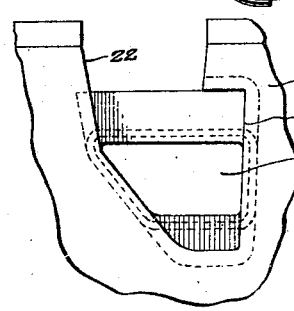
Fig. 5.
Fig. 6.

1,647,392

UNITED STATES PATENT OFFICE.

ALBERT A. BRUDER, OF HOLLY, MICHIGAN.

FURNACE.

Application filed July 31, 1925. Serial No. 47,254.

In my Patents Nos. 1,368,983, dated Feb. 15, 1921; 1,419,011, dated June 6, 1922; and 1,491,191, dated April 22, 1924, there is disclosed a furnace including a drum having its upper end communicating with the upper end of the combustion chamber of the furnace and its lower end communicating with the fire box of the furnace. The down flue establishes communication between the fire box and the upper end of the combustion chamber, and means extends into the upper end of the down flue to produce a draft therein so that products of combustion are caused to pass into the fire box and drum. In my Patent No. 1,541,108, dated June 9, 1025, there is disclosed a grate that may be advantageously used in connection with the furnace, and in this application there are certain improvements that may be characterized as follows.

First, the furnace is provided with novel air intake members and water heaters constructively arranged so that a supply of water may be expeditiously and economically heated by absorbing heat from "hot point" members of the furnace and the air supply members are disposed to have a cooling effect on the hot point members, whereby said hot point members are protected to a certain extent from burning out under the intense heat condition maintained at times in the furnace. These water heating and air supplying members are removable from the furnace without materially disturbing other parts of the furnace structure, such being desirable in case either of the members should be defective.

Second, in the operation of a furnace of the type disclosed in my prior patents I found an accumulation of soot and other matter at certain points, and my improved furnace includes a down pipe and damper arrangement that positively prevents the accumulation or pocketing of soot and other matter.

Third, an improved Venturi member is employed for producing a draft in the down flue, said member now forming the upper part of a combustion chamber, and this member, as well as other parts of the furnace have been designed and constructed to facilitate assembling the furnace parts and to provide a more durable, easily controlled and efficient furnace than disclosed in my prior patents.

My invention will be hereinafter described by aid of the drawings, wherein

Fig. 3 is a horizontal sectional view taken on the line III—III of Fig. 2;

Fig. 4 is an elevation of a portion of the furnace front wall;

Fig. 5 is a plan of the furnace;

Fig. 6 is an elevation of a portion of the furnace rear wall;

Fig. 7 is a longitudinal sectional view of air supply and water heating members;

Fig. 8 is a perspective view of the same;

Fig. 9 is a horizontal sectional view of the furnace on a smaller scale and taken on or about line IX—IX of Fig. 1, and Fig. 10 is a front elevation of the furnace structure.

Figure 1:
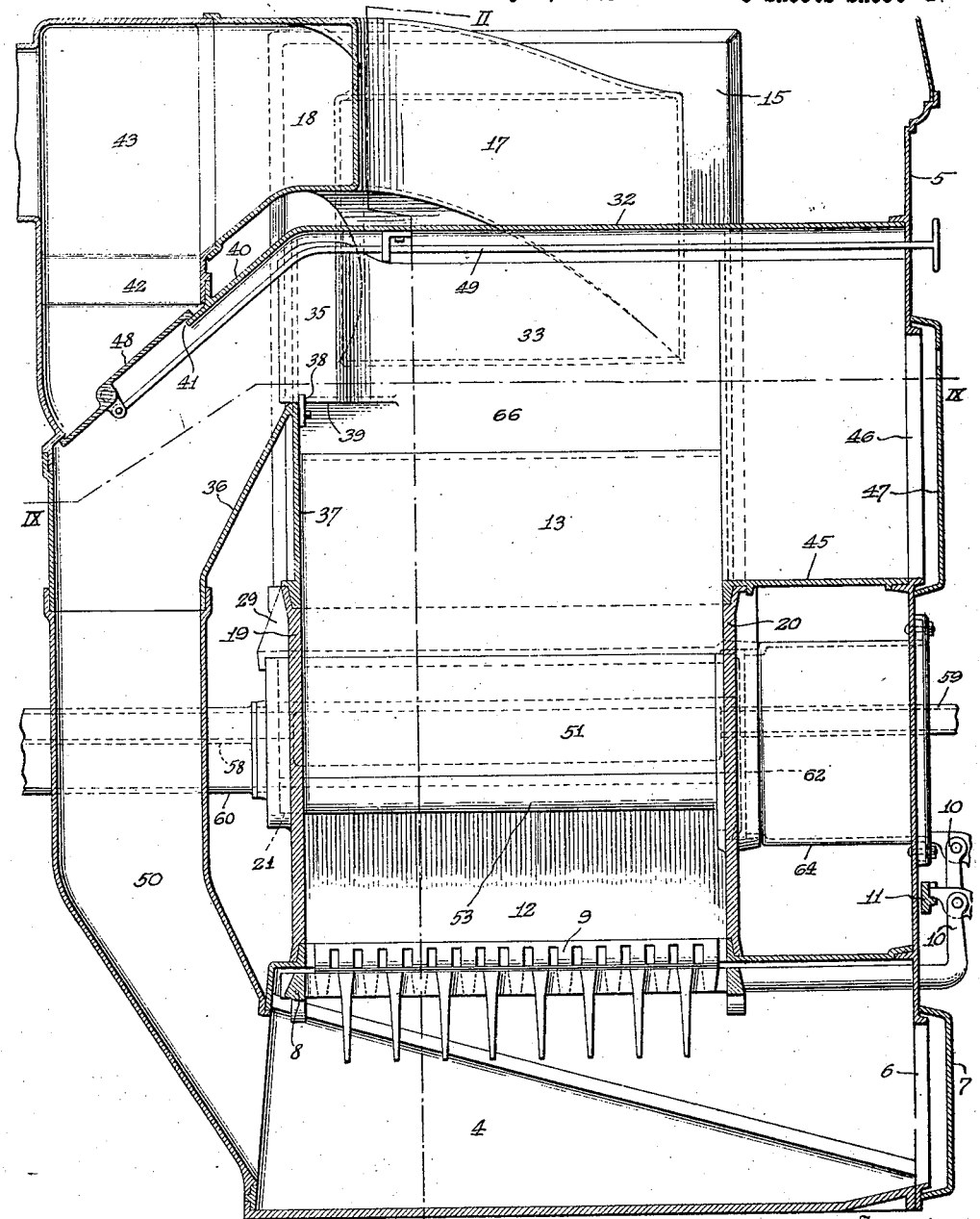
Figure 1 is a vertical longitudinal sectional view of the furnace.

My furnace being of the hot air type necessarily includes a casing or suitable enclosure 1 having cold air inlet ducts 2 and warm outlet flues 3.

In the casing 1 is the furnace proper consisting of a base or ash pit which extends to the front wall 5 of the casing 1 and is provided with the usual doorway 6 normally closed by a door 7. In this ash pit may be placed a grate, preferably of the type disclosed in my Patent No. 1,541,108 mentioned above, the grate including a grate frame 8, rockable grate units 9 supported by the frame 8, individual rockers 10 in front of the casing wall 5 for rocking the grate units, and reciprocatory means, generally designated 11 so that all of said rockers may be actuated in synchronism and yet permit of either individual rocker being actuated. I find this a very efficient grate structure for my type of furnace.

Mounted on the base or ash pit 4 is a fire box 12 having its bottom formed by the grate units 9 and the top of said fire box opens into a combustion chamber 13. The fire box 12 is formed with diverging or angularly disposed drum connections 14 and seated on the upper ends of these drum connections 14 are side drums 15 which have the upper ends thereof closed and the confronting sides of said drums provided with openings 16 communicating with the converging branches 17 of an exhaust member 18.

The fire box 12 and the drum connections 14 have a common rear wall 19 and a common front wall 20. In the rear wall 19 are seats 21 and 22 and openings 23 and in the front wall 20 are seats 24 and 25 and openings 26. In the seats 22 and 25 are placed detachable channel members 27 which have the outer walls 28 thereof cooperating with the drum connections 14 in supporting the drums 15. The inner walls 29 of the channel members 27 cooperate with the rear wall 19 and the front wall 20 in supporting a hot air casing 30 which may be braced relative to the combustion chamber 13 by spacing members 31. The hot air casing 30 has its side walls connecting the walls 19 and 20 and said casing has an arched top wall 32 a portion of which extends below the branches 17 of the exhaust member 18.

Mounted on the combustion chamber 13, within the hot air casing 30 is a Venturi member 33 having side walls 66 extending from the combustion chamber 13 to the top wall 32 of the hot air casing 30 and the walls 66 cooperate with the side walls of the combustion chamber 13 and the casing 30 in forming vertical hot air flues 34. The rear ends of the side walls 66 of the Venturi member 33 are formed with wings 35 inset towards each other relative to walls 66, there being a gradual restricted passage from the front portion of the Venturi member to the rear portion thereof, and said wings extend into a down flue connection 36 forming part of the hot air casing 30. The casing 30 includes a rear wall 37, as an extension of the rear wall 19 and at the upper edge of the wall 37 may be suitable supports or spacers 38 for the wings 35 of the Venturi member. On account of the wing formation of the side walls 66 of the Venturi member 33 the greater part of the side walls 66 is of less length than the side walls of the casing, as best brought out in Fig. 9, so that there may be side passages 39 establishing communication between the hot air casing 30 and the down flue connection 36. As a result of this constructive arrangement of parts hot air passing upwardly in the casing 30 and through the passages 39 into the down flue connection 36 induces a draft between the wings 35, there being somewhat of a siphonic action which withdraws smoke and gases from the combustion chamber 13 into the down flue connection 36.

Figure 2:
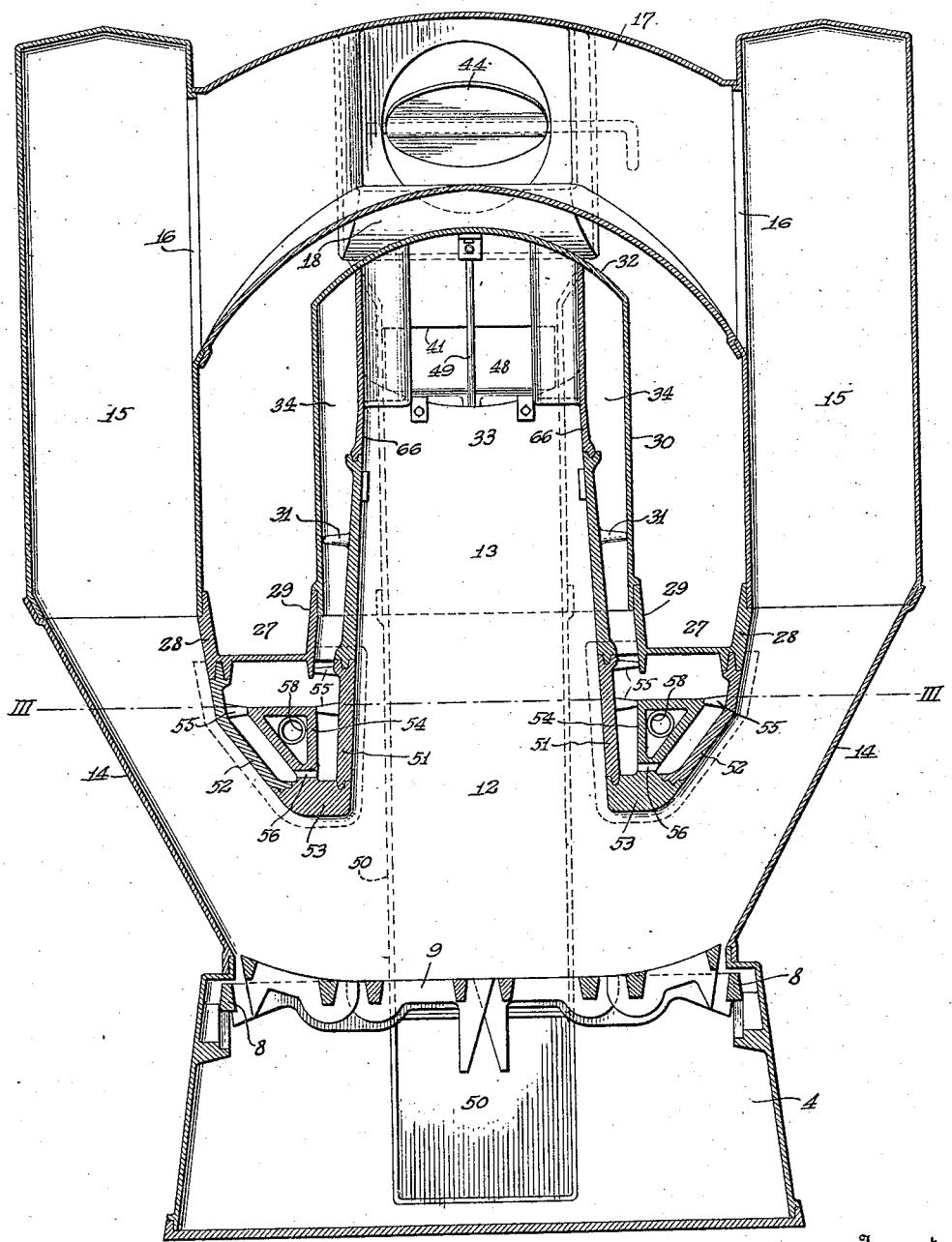
Fig. 2 is a vertical cross sectional view taken on the line II—II of Fig. 1.

The arched top wall 32 of the hot air casing 30 is extended to form a damper wall 40 of the down flue connection 36, said damper wall having a large opening 41 communicating with a connection 42 of an exhaust flue 43, which also communicates with the exhaust member 18. The exhaust flue 43 communicates with the atmosphere and in said exhaust flue may be placed a conventional form of damper 44. See Fig. 2.

The arched top wall 32 extends forwardly to form part of a fuel inlet connection 45 supported by the front wall 20 and the front wall 5 and communicating with a doorway 46 normally closed by a door 47. Obviously the door 47 may have air inlet openings and it is through the medium of the inlet connection 45 that all kinds of fuel may be placed in the combustion chamber 13.

The damper opening 41 of the down flue connection 36 is closed by a normally inclined wing damper 48 connected to an operating rod 49 suitably supported from the arched top wall 32 and extending through the casing front wall 5 so as to be manually actuated.

The down flue connection 36 communicates with the top of a down flue 50 having its lower end inclined into communication with the base or ash pit 4 of the furnace and in consequence of this down flue smoke and gases entering the connection 36 will enter the ash pit 4 and pass upwardly through the grate units 9 into the bed of fire maintained on the grate in the fire box 12.

At the juncture of the fire box 12 and the drum connections 14 are air inlet members and water heating members. The air inlet members are composed of inner walls 51 and outer walls 52, said outer walls having the upper edges thereof joining the channel members 27 and said inner walls having the upper edges thereof joining the side walls of the combustion chamber 13. The lower edges of the walls 51 and 52 join hot point members 53 and these hot point members support hollow triangular shaped water heating members 54 braced from the walls 51 and 52 by spacing members 55. The hollow triangular shaped water heating members 54 join the hot point members 53 by apertured web portions 56 and the apertures not only permit of air circulating in the lower portions of the air heating members, but afford a weakened portion more susceptible to fracture than other parts of the water heating members, consequently if these water heating members are fractured the fracture occurs without leakage of water, which is desirable in connection with the furnace including a water back or water heating device.

The walls 51 and 52 and the hot point members 53 have the ends thereof supported in the seats 21 and 24 of the walls 19 and 20 respectively, and the hollow water heating members 54 have end walls 57 connected to pipes 58 and 59, the latter connecting the front ends of the water heating members 54, as best shown in Fig. 3. so that water may circulate through the water heating members.

The openings 23 in the rear wall 19 provide clearance for the pipes 58 and are of sufficient area to permit of air entering the rear ends of the air heating members from conduits 60 connecting the wall 19 to the rear wall 61 of the furnace casing 1, the conduits 60 opening into the cellar or room containing the furnace.

The seats 24 of the front wall 20 accommodate plates 62 provided with air inlet openings 63 and these openings, best shown in Figs. 7 and 10 provide clearance for the connecting pipes 59. The plates 62 are retained in place by air inlet conduits 64 engaging the seats 24 of the wall 20 and extending through openings in the front wall 5 of the casing 1.

Assuming that a fire is built on the grate 9 and fuel supplied thereto from the combustion chamber 13, which serves as a magazine, the operation of the furnace may be considered substantially as follows:

Air entering the conduits 58 and 64 passes through the openings 23 and 63 into the air heating members formed by the channel members 27, and walls 51 and 52 and the hot point members 53. The air entering the openings 23 and 63 reaches the lower portions of the air heating members so as to be brought into contact with the hot point members 53 and the lower portions of the walls 51 and 52. In other words, the air cannot immediately pass upwardly into the flues 34, but must impinge against the walls 51 and 52 to the extent of being heated. The hot air passing upwardly in the side flues 34 enters the passages 39 and produces a draft rearwardly in the upper portion of the Venturi member 33 forming the upper portion of the combustion chamber 13, consequently any smoke or unburned gases above the fuel in the combustion chamber is drawn into the down flue connection 36 and commingles with the hot air. These admixtures are carried downwardly through the down flue 50 into the base or ash pit 4 of the furnace and impinge against the bed of fire on the grate units 9, either to be consumed or to pass through the bed of fire and increase the burning intensity of the fire bed. Unconsumed smoke and gases may pass through the fuel in the combustion chamber, but since resistance is encountered, the smoke and unburned gases pass upwardly through the drum connections 14, drums 15, branches 17 into the exhaust member 18 and out through the exhaust flue 43. It is obvious that this circulation causes all inflammable or combustible matter to reach the fire bed and as there is a constant draft in the drum connections 14 the fire bed will be very much alive at the hot point members 53, which it will be noted are somewhat heavy in order to withstand the intense heat. The condition of the fire in proximity to these hot point members may be observed by twyer members 65 connecting the casing wall 5 to the furnace wall 20. The intense heat at the hot point members 53 causes the walls 51 and 52 to be heated so that air is thoroughly heated before entering the flues 34 and it is this hot air commingling with smoke and unburned gases that lends combustion to the bed of fire when passing upwardly therethrough. Again, the heated air impinging against the hot water heating members 54 and cooperates with the water in said members in preventing excessive heating of the members 54, and it is obvious that the water may be thoroughly heated when passing through said water heating members. In other words, there is a co-operation in these parts of the furnace that not only insure a hot-water supply, but increase the efficiency of the furnace as a burner of all kinds of fuel, particularly fuel low in combustile matter.

When fuel is to be placed in the combustion chamber 13 by opening the door 47, the damper 48 is first opened and this accomplishes two results. First, with the door 47 and the damper 48 open, there is a draft across the combustion chamber and smoke and gases are carried into the exhaust flue 43, temporarily retarding the draft action in the fire box. Opening the damper 48 prevents the smoke and gases from being emitted at the open doorway 46, and any soot or other matter not consumed by the fire and which might accumulate on the damper 48 is discharged into the down flue 50 into the ash pit 4 from where it may be removed from time to time.

The air in leaving the air heating members and passing upwardly into the casing 30 helps to cool the walls of the combustion chamber and when the furnace is properly fired the walls 19 and 20, casing 30, channel members 27, connections 14, drums 15, down pipe 50 and other parts of the furnace radiate heat to the extent that the interior of the casing 1 is thoroughly heated, thus insuring a supply of hot air for the flues 3 of the casing.

I desire to direct attention to the construction of the water and air heating members which are removable from the front wall 20 of the furnace by removing the air conduits 64. The parts of these water and air heating members are joined by cement or interlocking connections so as to be reasonably tight and yet permit of expansion and contraction incident to the operation of the furnace. Should anything happen to these water and air heating members the injured parts can be easily replaced without tearing down the entire furnace and other parts of the furnace have been constructed with the same thought in view. With proper piping in connection with the members 54 there is no chance of water leakage or flooding of the furnace, because as previously pointed out if there is any weakness about the water heating members 54 it occurs at the web portions 56 thereof without any water escaping from said members.

It is thought that the refinements and improvements as compared to the furnaces of my prior patents will be apparent without further description and that my invention is susceptible to such changes as are permissible by the appended claims.

What I claim is:—

1. In a hot air furnace, a fire box, air heating members at the sides of said fire box adapted to receive air, each member including a hot point member, side walls and a channel member, and water heating members in said air heating members and adapted to have water circulated therethrough.

2. The combination of a casing, a furnace in said casing, air heating members at the sides of said furnace only and extending from the front of said furnace to the rear thereof, conduits connecting the ends of said air heating members to said casing to afford straight air passages through said casing, and a water heating member extending through said air heating members and conduits, said water heating member being enlarged within said air heating members.

3. The combination called for in claim 2, wherein said furnace includes a combustion chamber having hot air flues at the sides thereof with the lower ends of said flues communicating with said air heating members.

4. The combination called for in claim 2, wherein said air and water heating members are substantially triangular in cross section at the sides of said furnace with said members having integral lower portions.

5. An air heating member for a furnace having a fire box and a drum with the lower end of the drum communicating with the fire box, said air heating member having a relatively thick hot point portion at the juncture of said drum and fire box, said air heating member receiving air at its ends and discharging air at its top, and a water heating member extending through said air heating member.

6. A furnace as called for in claim 1, wherein said channel members cooperate with said fire box in providing air outlet passages at the sides of said fire box.

7. In a furnace wherein smoke and gases are conducted from the upper part of the combustion chamber to a fire box in the furnace, and wherein a draft is induced for conducting such smoke and gases:—means supplying warm air for said draft purposes said means comprising air heating members at the sides of said fire box and communicating with the upper portion of said combustion chamber, a casing at the sides of said combustion chamber and a Venturi member on said combustion chamber providing air passages.

8. In a hot air furnace wherein smoke and gases are conducted from the top of a combustion chamber to the bottom of a fire box by a draft induced in a down flue establishing communication between said combustion chamber and fire box; means supplying hot air for said draft purposes, said means comprising a Venturi member on said combustion chamber, said Venturi member having wings extending into said down flue, a casing at the sides of said combustion chamber cooperating therewith and with said Venturi member in forming side flues communicating with said down flue, and air heating members communicationg with said side flues and supplying air to said flues.

9. A furnace as called for in claim 8, wherein said air heating members are disposed at the sides of said fire box and receive air at the front and rear sides of said furnace.

10. In a hot air furnace wherein a grate supports a fire box supplied with a fuel from a combustion chamber having a down flue conducting smoke and gases from the top of the combustion chamber to said fire box, and wherein drums communicate with the fire box for the exhaust of unburned matter:—air heating members at the juncture of said drums with the fire box, said members supplying heated air to induce a draft down said down flue and up said drums.

11. A furnace as called for in claim 10, wherein said air heating members are water cooled.

12. A furnace having a fire box, a down flue adapted to conduct smoke and gases from over said fire box to under said fire box, a Venturi member extending into said down flue, an air heating member having a hot point in said fire box, and a casing establishing communication between said Venturi member and said air heating member so that heated air may enter said down flue to entrain smoke and gases therein.

13. A furnace as called for in claim 12, wherein said air heating member receives air from the front and rear sides of said furnace.

14. A furnace as called for in claim 12, further characterized by a water heating member in said air heating member.

15. A furnace as called for in claim 12, further characterized by a water heating member in said air heating member with said water heating member joining said air heating member by a weakened web.

16. A furnace as called for in claim 12, wherein said air heating member is formed by a channel member, side walls, and a member providing the hot point in said fire box.

17. An air heating member for a furnace having a fire box and a drum with the lower end of the drum communicating with the fire box, said air heating member being at the juncture of said drum and fire box, and having a relatively thick hot point portion.

18. An air heating member as called for in claim 17, and a water heating member supported in said air heating member by the hot point portion thereof.

19. A water cooling member for a furnace having a fire box and a drum with the lower end of the drum communicating with the fire box and a water conduit at the juncture of the drum with the fire box, said water cooling member inclosing the water conduit and affording an air passage from one portion of the conduit to another portion thereof, and means for regulating the passage of air through said member to control the temperature of water in the water conduit.

20. A water cooling member as called for in claim 19, wherein said member has a relatively thin hot point portion exposed to said fire box.

21. A water cooling member as called for in claim 19, wherein said member has a top air outlet at the side of the fire box.

22. In a furnace wherein a single water conduit is located at the side of a fire box and extends from the front of the furnace to the rear thereof and is adapted to be heated from the fire box, a protecting member surrounding said water conduit and providing an air passage lengthwise of said member so that air may circulate around the water conduit, said member having a top air outlet at the side of the fire box, and means controlling the passage of air through said member.

In testimony whereof I affix my signature.

ALBERT A. BRUDER.